United States Patent Office 3,375,263
Patented Mar. 26, 1968

3,375,263
WERNER COMPLEXES OF CHROMIUM AND OMEGA (ETHENYL CARBOXY) ALIPHATIC CARBOXYLIC ACIDS
John W. Trebilcock, Holiday Hills, Wilmington, Del., assignor to E. I. du Pont de Nemours and Company, Wilmington, Del., a corporation of Delaware
No Drawing. Filed Feb. 13, 1964, Ser. No. 344,559
9 Claims. (Cl. 260—414)

ABSTRACT OF THE DISCLOSURE

Werner complexes of trivalent nuclear chromium atoms coordinated with omega (ethenyl carboxy) aliphatic carboxylic acids such as methacryloxyundecanoic acid, are prepared by bringing together a water-soluble chromium salt such as basic chromic chloride, an alcohol such as isopropanol, and an omega (ethenyl carboxy) aliphatic carboxylic acid and heating the mixture at reflux for about 15 minutes. The Werner complexes are useful as glass-treating agents in the preparation of glass fiber-plastic laminates.

---

This invention relates to compositions comprising a metal Werner complex and to processes for producing them. More particularly, this invention relates to novel Werner complexes in which trivalent nuclear chromium atoms are co-ordinated with omega (ethenyl carboxy) aliphatic carboxylic acids.

Werner chromium complexes and compositions and methods for preparing them are known. Such compounds and methods are disclosed, for example, in Iler, U.S. Patent No. 2,273,040 issued Feb. 17, 1942; Iler, U.S. Patent No. 2,524,803 issued Oct. 10, 1950; and Goebel and Iler, U.S. Patent No. 2,544,666 issued Mar. 13, 1951.

In preparing laminated articles made from a wide variety of resins, it has been customary practice to utilize reinforcing elements such as glass cloth or fibers, in the articles to provide increased strength. It is also known that such reinforcing elements can be treated with various materials to improve the adhesion of the resin to the reinforcing elements.

The use of Werner complexes for the treatment of glass fibers which are to be bonded into resins is shown for example in Steinman U.S. Patent No. 2,552,910 issued May 15, 1951 and Steinman U.S. Patent No. 2,611,718 issued Sept. 23, 1952. While some Werner chromium complexes have been satisfactory as treating agents for the reinforcing elements in that the complexes provide satisfactory resin-to-element adhesion as long as the laminated product is used under substantially dry conditions, it is well known that often such chromium complexes leave much to be desired when the laminated product is used under conditions of high humidity or moisture, and especially when used in contact with or under water as in pipes, tubing, boats and boating equipment. As a result, based on this experience, the art has long sought for this use glass treating agents which would give improvement in the wet strength of such laminates.

According to the present invention, it has been found that a surprising improvement is obtained in wet strength of glass fiber-plastic laminates when the glass fibers have been treated with a chromium complex prepared in accordance with this invention.

The outstanding advantage of extremely high wet strength obtained for polyester resin laminates by the practice of the present invention is considered to be completely unobvious, in view of the fact that the carboxylic acids used contain an ester group which normally promotes water solubility and would therefore be expected to be conducive to lower wet strength.

The complexes of this invention are complexes of the Werner type in which a trivalent nuclear chromium atom is coordinated with the carboxylic acid group of an acid of the following general formula:

(1) 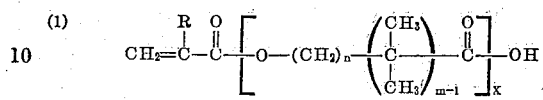

wherein R is H or $CH_3$;
$n$ is a whole number from 1 through 17;
$m$ is a whole number less than 3;
and X is a whole number less than 4.

The acids of Formula 1 can be prepared generally by the reaction of a hydroxy carboxylic acid with an anhydride or acid chloride of acrylic or methacrylic acid as shown in Strain U.S. Patent No. 2,141,546 issued Dec. 27, 1938. They can also be prepared generally by the reaction of an acrylate or methacrylate alkali-metal salt and an omega-halo alkanoic acid as shown in the examples.

The acids of Formula 1 where

R is H or $CH_3$
$n$ is a whole number from 1 through 10
$m$ is 1
and X is 1 are preferred because the Werner type chromium complexes made from them are particularly compatible with presently used commercial formulations.

The acids of Formula 1 where

R is H or $CH_3$
$n$ is a whole number from 5 through 11
$m$ is 1
and X is 1 are advantageous because of the outstanding wet strengths obtainable from the Werner type chromium complexes of these acids. Representative of these acids are methacryloxycaproic acid, in which R is $CH_3$ and $n$ is 5; methacryloxyoenanthylic acid in which R is $CH_3$ and $n$ is 6; methacryloxycaprylic acid in which R is $CH_3$ and $n$ is 7; methacryloxypelargonic acid in which R is $CH_3$ and $n$ is 8; methacryloxycapric acid in which R is $CH_3$ and $n$ is 9; methacryloxyundecylic acid in which R is $CH_3$ and $n$ is 10; and methacryloxylauric acid in which R is $CH_3$ and $n$ is 11.

The most preferred acid of Formula 1 is methacryloxyundecanoic acid, because of the particularly high wet and dry strengths exhibited by glass laminates made using the Werner type chromium complex prepared with this acid.

It is also preferred, when possible, to use pure acids of Formula 1 in preparing the complexes. However, particular methods of synthesis often give rise to a mixture of acids in which X of Formula 1 is 1, 2, and 3. Such a mixture can be used to prepare a size or finish for a reinforced laminate substrate, but efficiency is reduced as compared to the use of pure acids.

The molar ratio of chromium to acid in the complexes of this invention varies generally from about 1:1 to 5:1, although complexes having ratios outside of this range can be prepared with some decrease in effective properties. The molar ratio is preferably from 2:1 to 3:1.

The chromium carboxylic acid complexes of this invention can be prepared by the procedures disclosed more fully in the aforesaid patents or they can be prepared in a single step process by bringing together a water-soluble chromium salt such as basic chromic chloride, an alcohol such as isopropanol, and an omega (ethenyl carboxy) aliphatic carboxylic acid and heating the reaction mass to reflux for about 15 minutes.

The salt of the basic chromium ion can be any salt of such metal ionizable in aqueous solution. Illustrative of such salts of chromium include the chlorides, bromides, chlorates, iodides, nitrates, acetates, formates and the like. For convenience and economy, the chloride salts are generally preferred.

The water content of the basic chromium salt solution can vary from substantially anhydrous to large amounts of water. The water content of the chromium complex of the carboxylic acid will therefore range from very small amounts of water to substantial amounts of water, usually from about 3% to about 30%.

The reaction of the acid with the basic chromium salt can be carried out in any medium in which the reactants are mutually soluble. The medium is preferably an organic solvent, such as, for instance, ethanol, n-propanol, isopropanol or butanol. Isopropanol is the most preferred solvent.

The reaction is generally complete after the reactants have remained in contact with each other for a period of about twenty-four hours at a temperature of about 20° C. At a temperature of about 100° C., the complex is formed in about twenty minutes or less.

Aqueous solutions or dispersions of the chromium complexes of the present invention are best obtained by adding an alcoholic solution of the complex to water. The alcoholic solution and the water are thoroughly mixed. The alcoholic solution can be prepared directly or by dissolving the solid complex in the alcohol.

The pH of aqueous solutions of the chromium carboxylic acid complexes of the present invention, which normally contain at least 0.5% of an alcohol arising from the alcohol in which the complex is dissolved, can be adjusted if and as desired by the addition of a dilute alkali such as amines, ammonia or various inorganic bases. A 1% solution of ammonia works quite well to obtain a pH of from about 2.6 to 6.0.

The chromium complexes of this invention can be used to improve the adhesion of a resin to a reinforcing element either by sizing the glass fibers as they are made or by finishing the reinforcing element after removing the sizing compound which was used in its preparation.

A representative sizing composition according to this invention would comprise an emulsion of polyvinyl acetate and one of the chrome complexes described above. Such sizing compositions can be prepared by simply admixing the polyvinyl acetate emulsion and the chromium complex of this invention in water or other mutual solvents. The preferred novel sizing compositions of this invention also contain a lubricant such as an oil, wax or fat, which can also be simply admixed with the other ingredients in the water or other solvent.

The novel sizing compositions of this invention contain up to 15% of the chromium complexes by weight of the total weight of the composition and preferably contains at least 0.1 and not more than 8% by weight. There may also be admixed with the composition conventional amounts of such conventional size additives as adhesives, sizing materials, plasticizers, lubricants, etc.

The polyvinyl acetate emulsion can have any concentration desired and commercially the emulsions typically run up to 45 to 60% of polyvinyl acetate solids. It is normally the practice to include a small amount of a conventional plasticizer such as dibutyl phthalate or tricrestyl phosphate. Other commonly used plasticizers in polyvinyl acetate emulsions can also be used. In the application of size compositions of the invention to glass fibers, the compositions are usually applied at a concentration of from about 0.5 to 7% of the polyvinyl acetate commodity although this can be varied depending on the effect desired. This concentration of solids results in a solids pickup on the glass fibers of about 0.1 to 3%.

The lubricants are of a conventional type and are used in very small amounts in a conventional manner. In general, there is present about 5 to 15% by weight based upon the polyvinyl acetate of a petroleum or vegetable or animal oil, a wax, either natural or synthetic as paraffin wax, or a fat such as tristearin. There can also be used as a lubricant one of various organic materials which are oil or wax-like in consistency such as a long chain amine acetate which is water soluble.

In general, application of the novel sizing composition deposits 0.001% to 0.1% by weight as chromium on the glass fiber based upon the weight of the fiber, though this again can be varied over a wide range. Preferred amounts range from 0.01 to 0.06% by weight of chromium based upon the weight of the fiber.

One method according to this invention for modifying the surfaces of glass fibers in the preparation of glass fiber-reinforced plastic articles is to apply the size composition to the fibers while they are being formed. This can be done by wiping a solution of the size composition on a multiplicity of the filaments as they are mechanically drawn from the melting furnace and collected into strands. The sized strands are wound into the form of a cake and then dried at elevated temperatures, a temperature of 110 to 130° C. being satisfactory. The dried strands can then be either combined to make rovings and then cut into short pieces or cut directly into short pieces, the chopped strands then being laid out in a variety of forms for use in reinforcing plastics. The rovings made from the strands can also be used directly in reinforcing plastics. There are numerous other ways in which to prepare the sized strands for use in reinforcing plastics which are well known in the art.

The novel sizing compositions of this invention can also contain, in addition to conventional additives referred to above, other complex compounds, as well as other compatible materials.

A representative finishing solution according to this invention would comprise for example, a 2% aqueous solution of the complex commodity containing about 5% to 6% chromium and netralized to a pH of from about 2.6 to 6.0.

The process of applying such a finishing solution comprises treating a reinforcing element, often referred to as a substrate and usually consisting of glass fibers or cloth, with the finishing solution as by immersing the substrate in the solution, and then drying the treated reinforcing element at an elevated temperature. The cloth can then be washed to remove salts and redried, or used as is to form laminates by incorporating the element in polyester resin.

The laminating procedure can follow any of the methods well known in the laminating industry and the particular manipulative steps used are not critical. Suitable procedures are disclosed, for example, in Biefeld U.S. Patent No. 2,763,573 issued Sept. 18, 1956.

Useful resins for such laminates include, but are not limited to, polyester, phenolic, polyamide and polyepoxide resins. A preferred group of resins for use in this invention is the polyglycol esters of maleic or fumaric acid and mixtures of these polyesters with styrene.

The resinous structure may also include dyes, pigments, fillers, powders, flakes, etc. depending on the intended use for the structure and the effect desired.

The reinforcing element can be any of those generally used in the art. Although the use of the invention is set forth primarily with reference to glass cloth and glass fiber reinforcing, it will be understood that equivalent material including inorganic fillers such as clay, silica, mica, alumina, and asbestos, or organic material such as cellulose, paper or natural or synthetic fibers or fabric can be used.

This invention will now be more fully described but is not intended to be limited by the following illustrative examples:

EXAMPLE 1

To prepare the chrome complex 64.0 grams of basic chromic chloride solution containing 7.88% Cr are prepared according to the procedure described in U.S. Patent No. 2,683,156 issued July 6, 1954, and are dissolved in 19.0 grams of isopropanol. 7.0 grams of methacryloxyacetic acid are added to the basic chromic chloride solution. The reactants then are heated to reflux for 15 minutes and allowed to cool. The resulting solution contains a chrome complex of methacryloxyacetic acid with a 2/1 Cr/acid mole ratio and 5.6% Cr.

A treating solution is prepared by diluting 40 grams of the chrome complex solution made above with 1960 ml. of water with agitation and adjusting the pH to 6.0 with a 1% aqueous ammonia solution.

Pieces of heat-cleaned 181-style glass cloth (described in U.S. Air Force Specification No. 12051, Aug. 3, 1949), are then immersed in the treating solution for a period of 1 minute. The glass fabric is then passed through a rubber rolled hand wringer and dried in an oven at 125° C. for 10 minutes. After the fabric is removed from the oven it is allowed to cool and then is washed in 1500 ml. of distilled water and redried at 125° C. for 10 minutes.

A laminate is prepared from the treated glass cloth by impregnating pieces of the cloth with a polyester resin, such as Paraplex–P–43, containing 1% benzoyl peroxide as a curing catalyst. A sandwich containing 12 layers of glass fabric and approximately 60% glass is formed and cured under a pressure of 90 p.s.i. in a press at 175° F. for 15 min., 225° F. for 20 mins., and 275° F. for 20 min. The laminate is then allowed to cool and is removed from the press and cut into flexural strength samples. The samples, as shown by standard testing procedures as for example according to Federal Specification L–P–406a, exhibit high flexural strength before and after boiling in water for two hours.

EXAMPLE 2

About 5428 grams of basic chromic chloride solution containing 7.65% Cr are dissolved in 919 grams of isopropanol. 1072 grams of methacryloxyundecanoic acid are added to the basic chromic chloride solution and a chrome complex with a 2/1 Cr/acid mole ratio and 5.6% Cr is prepared as in Example 1.

A treating solution of the chrome complex is prepared as in Example 1 and the pH is adjusted to 3.5 with a 1% aqueous ammonia solution.

Glass fibers are treated with the solution and made into a laminate as in Example 1 and the laminate exhibits outstanding high flexural strengths.

EXAMPLE 3

About 35.4 grams of basic chromic chloride solution containing 7.88% Cr are dissolved in 6.1 grams of isopropanol. 5.0 grams of methacryloxypivalic acid are added to the basic chromic chloride solution and a chrome complex with a 2/1 Cr/acid mole ratio and 6% Cr is prepared as in Example 1.

A treating solution of the chrome complex is prepared as in Example 1 and the pH is adjusted to 4.0 with a 1% aqueous ammonia solution.

Glass fibers are treated with the solution and made into a laminate as in Example 1 and the laminate exhibits similar high flexural strengths.

EXAMPLE 4

About 66 grams of basic chromic chloride solution containing 7.88% Cr are dissolved in 7.8 grams of isopropanol. 12.8 grams of acryloxyundecanoic acid are added to the chromic chloride solution and a chrome complex with a 2/1 Cr/acid mole ratio and 6% Cr is prepared as in Example 1.

A treating solution is prepared as in Example 1 and the pH is adjusted to 2.6 with a 1% aqueous ammonia solution.

Glass fibers are treated with the solution and made into a laminate as in Example 1 and the laminate exhibits similar high flexural strengths.

EXAMPLE 5

About 136 grams of a basic chromic chloride solution containing 7.65% Cr are diluted with 14.6 grams of isopropanol. The basic chromic chloride solution is mixed with 35.4 grams of omega-methacryloxyheptadecanoic acid and a chrome complex with a 2/1 Cr/acid mole ratio and 5.6% Cr is prepared as described in Example 1.

A treating solution of the chrome complex is prepared as in Example 1 and the pH is adjusted to 3.5 with a 1% aqueous ammonia solution.

Glass fibers are treated with the solution and made into a laminate as in Example 1 and the laminate exhibits outstanding high flexural strengths.

EXAMPLE 6

About 136 grams of a basic chromic chloride solution containing 7.65% Cr is mixed without further dilution with 59.0 grams of omega-methacryloxy-(omega-undecanoxyundecanoic) acid and a chrome complex with a 2/1 Cr/acid mole ratio and 5.35% Cr is prepared as described in Example 1.

A treating solution of the chrome complex is prepared as in Example 1 and the pH is adjusted to 3.5 with a 1% aqueous ammonia solution.

Glass fibers are treated with the solution and made into a laminate as in Example 1 and the laminate exhibits outstanding high flexural strengths.

EXAMPLE 7

This example illustrates the second mentioned method for preparing the acids used in this invention.

A mixture of 20 g. hydroquinone, 1600 ml. dimethylformamide and 400 ml. methacrylic acid is heated in a 5-liter flask to 150° C. Sodium methacrylate (432.4 g.; 4 moles) is added, followed by 1205 g. (4 moles, based on 88% purity) of 11 - bromoundecanoic acid ("Organico" S.A., Paris, France). The total time required for addition of the latter two reagents is about 18 minutes, during which time the pot temperature is kept at about 150° C. When addition is complete, heating at 150° C. is continued for 15 minutes. As the reaction proceeds, some sodium bromide precipitates. The hot mixture is poured into 8 liters of rapidly stirred distilled water. Two layers form. Almost all the bottom (aqueous) layer is removed and discarded; the last fraction is slow to separate from the upper layer. Two liters of hexane are added and the mixture is shaken. On standing, the last portion (about 500 ml.) of aqueous layer settles out and is discarded. A small amount of sticky, black precipitate clings to the walls of the vessel. The organic layer is removed, washed with five two-liter portions of water, and dried over magnesium sulfate. A solution of six grams of hydroquinone in a little acetone is added, and the solvent is stripped off in vacuo. The bath temperature during stripping is not allowed to go above about 70° C. The residual oil weighs 1154 g. The neutralization equivalent is 270, saponification equivalent 272, and the bromine equivalent 318.

The invention claimed is:

1. A Werner complex in which a trivalent nuclear chromium atom is coordinated with the carboxylic acid group of an acid of the formula $$CH_2=\overset{R}{\underset{|}{C}}-\overset{O}{\underset{\|}{C}}\left[O-(CH_2)_n-\left(\overset{CH_3}{\underset{\underset{CH_3}{|}}{C}}\right)_{m-1}-\overset{O}{\underset{\|}{C}}\right]_x-OH$$

wherein R is selected from the group consisting of H and $CH_3$;

$n$ is a positive integer less than 18;
$m$ is a positive integer less than 3;
and $X$ is a positive integer less than 4, the molar ratio of chromium to acid being from about 1:1 to 5:1.

2. A Werner complex as set forth in claim 1 wherein said chromium to acid ratio is from about 1:1 to 5:1.

3. A Werner complex as set forth in claim 1 wherein said acid is methacryloxycaproic acid.

4. A Werner complex as set forth in claim 1 wherein said acid is methacryloxyoenanthylic acid.

5. A Werner complex as set forth in claim 1 wherein said acid is methacryloxycaprylic acid.

6. A Werner complex as set forth in claim 1 wherein said acid is methacryloxypelargonic acid.

7. A Werner complex as set forth in claim 1 wherein said acid is methacryloxycapric acid.

8. A Werner complex as set forth in claim 1 wherein said acid is methacryloxyundecylic acid.

9. A Werner complex as set forth in claim 1 wherein said acid is methacryloxylauric acid.

References Cited

UNITED STATES PATENTS

| 3,185,717 | 5/1965 | Trebilcock | 260—438.5 |
| 3,136,796 | 6/1964 | Trebilcock | 260—438.5 |
| 2,273,040 | 2/1942 | Iler | 260—414 X |

ALEX MAZEL, *Primary Examiner.*

J. NARCAVAGE, *Assistant Examiner.*